US012688170B2

(12) United States Patent
Lin et al.

(10) Patent No.: US 12,688,170 B2
(45) Date of Patent: Jul. 21, 2026

(54) METHOD, APPARATUS, DEVICE AND MEDIUM FOR TABLE DATA VERIFICATION

(71) Applicant: Beijing Zitiao Network Technology Co., Ltd., Beijing (CN)

(72) Inventors: Zihuan Lin, Beijing (CN); Weijia Wen, Beijing (CN); Shuming Tan, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/725,717

(22) PCT Filed: Dec. 12, 2022

(86) PCT No.: PCT/CN2022/138370
§ 371 (c)(1),
(2) Date: Jun. 28, 2024

(87) PCT Pub. No.: WO2023/124937
PCT Pub. Date: Jul. 6, 2023

(65) Prior Publication Data
US 2026/0119466 A1 Apr. 30, 2026

(30) Foreign Application Priority Data

Dec. 29, 2021 (CN) .......................... 202111643678.8

(51) Int. Cl.
*G06F 16/215* (2019.01)
(52) U.S. Cl.
CPC .................................. *G06F 16/215* (2019.01)

(58) Field of Classification Search
CPC ...................................................... G06F 16/215
See application file for complete search history.

(56) References Cited

U.S. PATENT DOCUMENTS

2007/0050700 A1* 3/2007 Simkhay ................. G06F 40/18
715/220
2007/0101252 A1 5/2007 Chamberlain et al.
(Continued)

FOREIGN PATENT DOCUMENTS

CN 106648568 A 5/2017
CN 107451112 A 12/2017
(Continued)

OTHER PUBLICATIONS

International Search Report received for PCT Patent Application No. PCT/CN2022/138370, mailed on Mar. 6, 2023, 7 pages (3 pages of English Translation and 4 pages of Original attached).
(Continued)

*Primary Examiner* — Jay A Morrison
(74) *Attorney, Agent, or Firm* — Astute IP Law Group

(57) ABSTRACT

The present disclosure discloses a method of table data verification. Specifically, a user can set a format of a target cell and a data verification condition of the cell, where the data verification condition includes a first format and a data range. That is, the data verification condition can not only verify a format of an input data in the cell, but also verify a range of the input data. In a case that the user inputs the target data into the target cell, the target data is obtained, the format of the target data and the value of the target data are verified using the set data verification condition to obtain a verification result. Here, the format of the target data is the second format corresponding to the target cell.

17 Claims, 3 Drawing Sheets

IN RESPONSE TO SETTING BEING TRIGGERED BY A USER, OBTAIN A DATA VERIFICATION CONDITION SET FOR A TARGET CELL, THE DATA VERIFICATION CONDITION INCLUDING A FIRST FORMAT AND A DATA RANGE

S101

IN RESPONSE TO INPUTTING BEING TRIGGERED BY THE USER, OBTAIN A TARGET DATA INPUT BY THE USER IN THE TARGET CELL

S102

VERIFY A FORMAT OF THE TARGET DATA AND A VALUE OF THE TARGET DATA ACCORDING TO THE DATA VERIFICATION CONDITIONS TO OBTAIN A VERIFICATION RESULT, WHERE THE FORMAT OF THE TARGET DATA IS A SECOND FORMAT CORRESPONDING TO THE TARGET CELL

S103

(56) References Cited

U.S. PATENT DOCUMENTS

2015/0261796 A1\*   9/2015   Gould ................. G06Q 10/067
                                                    707/694
2017/0357628 A1   12/2017   Hurley et al.

FOREIGN PATENT DOCUMENTS

| CN | 109408506 | A | 3/2019 |
| CN | 109522452 | A | 3/2019 |
| CN | 111104783 | A | 5/2020 |
| CN | 111400380 | A | 7/2020 |
| CN | 112507677 | A | 3/2021 |
| CN | 113504957 | A | 10/2021 |
| CN | 114357954 | A | 4/2022 |
| CN | 114357954 | B | 12/2024 |

OTHER PUBLICATIONS

Office Action for Chinese Patent Application No. 202111643678.8, mailed on Jul. 15, 2024, 22 pages.

\* cited by examiner

S101

IN RESPONSE TO SETTING BEING TRIGGERED BY A USER, OBTAIN A DATA VERIFICATION CONDITION SET FOR A TARGET CELL, THE DATA VERIFICATION CONDITION INCLUDING A FIRST FORMAT AND A DATA RANGE

S102

IN RESPONSE TO INPUTTING BEING TRIGGERED BY THE USER, OBTAIN A TARGET DATA INPUT BY THE USER IN THE TARGET CELL

S103

VERIFY A FORMAT OF THE TARGET DATA AND A VALUE OF THE TARGET DATA ACCORDING TO THE DATA VERIFICATION CONDITIONS TO OBTAIN A VERIFICATION RESULT, WHERE THE FORMAT OF THE TARGET DATA IS A SECOND FORMAT CORRESPONDING TO THE TARGET CELL

FIG. 1

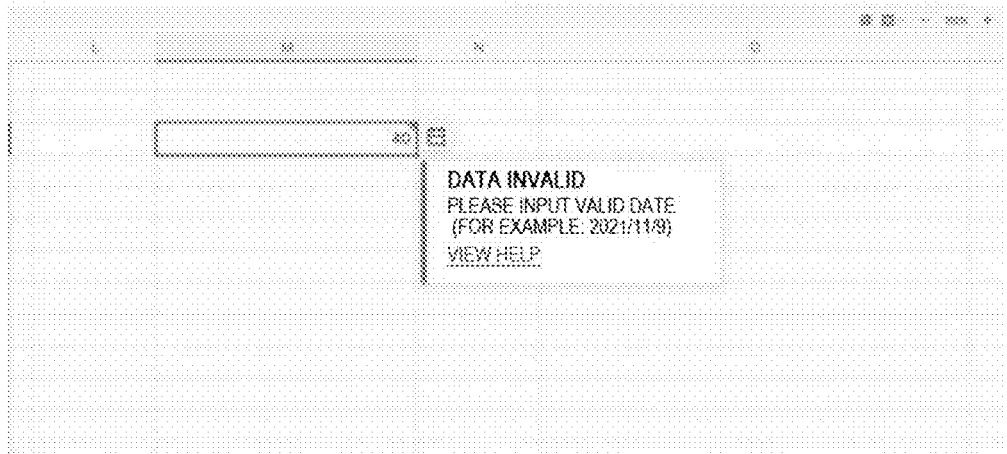

FIG. 2a

DATA VERIFICATION      ✕

VERIFICATION
CONDITION

PROGRESS BAR

TIME

DATE

TEXT LENGTH

CHECK BOX

PROGRESS BAR

CANCEL     OK 0.5

METHOD, APPARATUS, DEVICE AND MEDIUM FOR TABLE DATA VERIFICATION

The present application is a national stage application filed under 35 U.S.C. 371 based on International Patent Application No. PCT/CN2022/138370, filed on Dec. 12, 2022, which claims priority to Chinese Patent Application No. 202111643678.8 filed on Dec. 29, 2021, and entitled "METHOD, APPARATUS, DEVICE AND MEDIUM FOR TABLE DATA VERIFICATION", the entireties of which are incorporated herein by reference.

FIELD

The present disclosure relates to the field of computer technology, and specifically to a method, an apparatus, a device and a medium for table data verification.

BACKGROUND

Spreadsheet, also known as electronic data sheet, is a series of cells composed of rows and columns. A cell can store values, calculation formulas, text, and/or the like. Currently, the spreadsheet supports setup of data verification for the cell, in order to use data verification to add certain restrictions for the input data. For example, it is limited that only a specific value can be input within a cell.

However, restriction ability of the current data verification function of the cell is weak, which cannot meet a demand for more accurate and standardized data entry.

SUMMARY

In view of this, the present disclosure provides a method, an apparatus, a device and a medium for table data verification to implement a plurality of restrictions through the data verification function of the cell to meet the demand for more accurate and standardized data entry.

In order to achieve the above purpose, the technical solutions provided by the present disclosure are as follows:

In the first aspect of the present disclosure, there is provided a method of table data verification, which may comprise:

in response to setting being triggered by a user, obtaining a data verification condition set for a target cell, the data verification condition including a first format and a data range;

in response to inputting being triggered by the user, obtaining a target data input by the user in the target cell; and verifying a format of the target data and a value of the target data according to the data verification condition to obtain a verification result, the format of the target data being a second format corresponding to the target cell.

In a second aspect of the present disclosure, there is provided a device for table data verification, which may comprise:

a first obtaining unit configured to in response to setting being triggered by a user, obtain a data verification condition set for a target cell, the data verification condition including a first format and a data range;

a second obtaining unit configured to in response to inputting being triggered by the user, obtain a target data input by the user in the target cell;

a third obtaining unit configured to verify a format of the target data and a value of the target data according to the data verification condition to obtain a verification result, the format of the target data being a second format corresponding to the target cell format.

In a third aspect of the present disclosure, there is provided an electronic device, comprising:

a processor and a memory;

the memory configured to store instructions or computer programs;

the processor configured to execute the instructions or the computer programs stored in the memory to cause the electronic device to perform the method of table data verification described in the first aspect.

In a fourth aspect of the present disclosure, there is provided a computer-readable storage medium, the computer-readable storage medium storing instructions, the instructions, upon running on a device, causing the device to perform the method of table data verification described in the first aspect.

In a fifth aspect of the present disclosure, there is provided a computer program product, the computer program product, upon running on a computer, causing the computer to perform the method of table data verification described in the first aspect.

It can be seen that the embodiments of the present disclosure have the following beneficial effects:

In the present disclosure, the user can set the format of the target cell and the data verification condition of the cell, where the data verification condition includes the first format and the data range. That is, the data verification condition can not only verify the format of the input data in the cell, but also verify the range of the input data. In a case that the user inputs target data into the target cell, the target data is obtained, the format of the target data and the value of the target data are verified using the set data verification condition to obtain a verification result. Here, the format of the target data is the second format corresponding to the target cell. That is, the format of the target data and the value of the target data are simultaneously verified using the data verification condition to ensure that the format and the value of the input target data match the format and the data range restricted in the data verification condition, so as to improve the accuracy of the target data.

BRIEF DESCRIPTION OF THE DRAWINGS

In order to more clearly illustrate the embodiments of the present disclosure or the technical solutions in the prior art, the accompanying drawings that needed to be used in the description of the embodiments or the existing art will be briefly introduced below. It is obvious that the accompanying drawings in the following description are only some of the embodiments described in the present disclosure, and other accompanying drawings can be obtained based on these accompanying drawings, for a person of ordinary skill in the art without exerting creative efforts.

FIG. 1 is a flowchart of a method of table data verification according to an embodiment of the present disclosure;

FIG. 2a is a schematic diagram of an application scenario according to an embodiment of the present application;

DETAILED DESCRIPTION

Figures 2B, 2C:
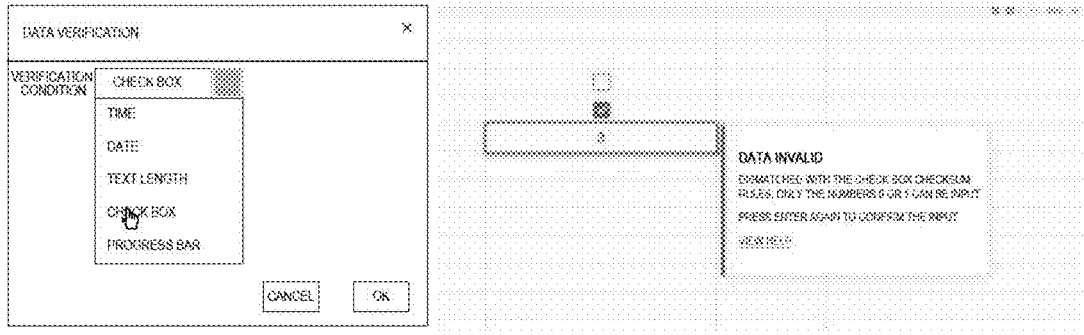
FIG. 2b is a schematic diagram of rendering of a check box according to an embodiment of the present disclosure.
FIG. 2c is a schematic diagram of rendering of a progress bar according to an embodiment of the present disclosure.

In order to enable a person of ordinary skill in the art to better understand the embodiments of the present disclosure, the technical solutions in the embodiments of the present disclosure will be described clearly and completely in the following in conjunction with the accompanying drawings in the embodiments of the present disclosure, and it is obvious that the described embodiments are only a part of the present disclosure, and not all of the embodiments. Based on the embodiments in the present disclosure, all other embodiments obtained by the person of ordinary skill in the art without making creative efforts fall within the scope of protection of the present disclosure.

In the actual application, in a case that a user uses tables to process data, the user can set a data type in a cell format according to his/her own needs to ensure that the input data can be displayed according to the set data type. Here, the data type may include: general, numerical, currency, date, time, fraction, and/or the like. Furthermore, in order to improve work efficiency and avoid an illegal data entry, users can also set data verification for a cell in order to define the data that can be or should be input in the cell by setting the verification condition for the data verification. For example, the data types that can be selected for the verification condition in data verification include: an integer, a decimal, a time, a date, a text length, and/or the like, and the corresponding data range can also be set for the data type (data format) that are allowed to be input. For example, if the selected verification condition is a date, the start date is set to Nov. 1, 2021 and the end date is set to Nov. 21, 2021 the data verification only allows the user to input data between Nov. 1, 2021-Nov. 21, 2021.

However, the current data verification function is relatively strict in verifying the data range, and there are still flaws in the verification of the data type of the data, which is unable to meet the demand for more accurate and standardized data requirements for information input. For example, a data type of a cell format set by the user is "numerical value", the data verification condition set for the cell data type is a date, the start date is Nov. 1, 2021, and the end date is Nov. 21, 2021. In a case that the data input by the user is 44510, since the date corresponding to 44510 is Nov. 10, 2021, which is located in the above date range, the data verification is passed (only the data range is verified), and 44510.00 is displayed in the cell, not Nov. 10, 2021. If the data input by the user is 33100, since the date corresponding to the data is not located in the above date range, a prompt will be given that the input data is illegal.

Normally, the data type of the data verification condition set by the user is a date, and during data inputting, the verification can be passed when and only when the data input by the user is a date type of data. For example, in a case that the user inputs "Nov. 10, 2021" in the cell, the data type and value range will meet the set verification condition, and Nov. 10, 2021 will be displayed in the cell. However, the current data verification only supports the verification of the data range, but not support the verification for a digital format, which fails to meet the actual needs.

To this end, embodiments of the present disclosure provide a method of table data verification to limit a format of a cell in a case of limiting the value of the cell, so that the input data meets the actual needs.

In order to facilitate the understanding of the technical solution according to embodiments of the present disclosure, the following will be described in conjunction with the accompanying drawings.

Reference is made to FIG. 1 which is a flowchart of a method of table data verification according to embodiments of the present disclosure. As shown in FIG. 1, the method may comprise:

S101: in response to setting being triggerred by a user, a data verification condition set for a target cell is obtained.

In these embodiments, in order to enable the input data to meet the predetermined condition, the user can set the data verification condition for the target cell. The data verification condition includes a first format and a data range. Here, the data verification condition is used to verify whether the data input by the user in the target cell meets the predetermined condition, thereby ensuring that the input data meets the user need.

Here, the target cell may be one or more cells in a table, and the first format may include a data format and a rendering format. Here, the data format is used to indicate a type of data input in the target cell, and the rendering format is used to indicate a style presented by the target cell. The data format can include a numerical type, a date type, a currency type and a time type, and/or the like; the rendering format can include a check box format, a progress bar format, a cell style, a font format, and/or the like. Here, the cell style can include a background style, a border style, and/or the like; the font style can include a font color, a font type, an alignment mode, and/or the like. For example, in response to the format set by the user in data verification being a check box format, it is determined whether or not to render the cell as a check box according to the user input data. That is, in a case of setting the data verification on a cell, the cell can also be rendered according to a specific rendering rule, so that in a case that the data input in the cell matches the rendering rule, the presentation style required by the user can be rendered in the cell.

S102: in response to inputting being triggerred by the user, a target data input by the user in the target cell is obtained.

S103: by verifing a format of the target data and a value of the target data according to the data verification condition, a verification result is obtained.

In some embodiments of the present disclosure, in a case that the user inputs data into the target cell, the target data input by the user will be obtained, and the format of the target data and the value of the target data will be verified using the preset data verification condition to obtain the verification result. Here, the value of the target data can be a number, a text, or other verifiable content types.

In some embodiments of the present disclosure, the target data input by the user may be a data that meets the data verification condition, or it may be a data that does not meet the data verification condition. Therefore, the verification result can include legal data and illegal data. Further, the data dissatisfying the data verification condition may include that the format of the target data does not meet the first format of the data verification condition, and/or the value of the target data does not meet the data range of the data verification condition. Here, the format of the target data refers to the second format corresponding to the target cell, that is, the cell format set by the user. The second format mainly refers to the data format in the cell format. In these embodiments, the first format has a higher priority than the second format, that is, the data format in data verification has a higher priority than the data format in a cell format.

In some embodiments of the present disclosure, in response to the format of the target data mismatching with the data format in the data verification condition, and/or the value of the target data mismatching with the data range in the data verification condition, it is determined that the target data is illegal data. Here, the illegal data is invalid data. For example, the data format of the cell format set by the user is "numerical value", a data type of the data verification condition set for the cell is a date, the start date is Nov. 1, 2021, and the end date is Nov. 21, 2021. In a case that the data input by the user is 44510, the data format and the data range of the target data will be verified. Since the data format of the target data is "numerical value" mismatching with the data format "date" in the data verification, the input data of 44510 will be determined as invalid data. As another example, if the data input by the user is 33100, since the data format of the target data mismatches with the data format "date" in the data verification condition, and the date corresponding to the data is not located in the above date range, it is determined that the target data is invalid data.

In some embodiments of the present disclosure, in response to the first format being the rendering format and the value of the target data mismatching with the data range in the data verification condition, the target data is determined to be invalid data. That is, in a case that the first format for data verification is the rendering format, each rendering format may have its corresponding data range. For example, in response to the rendering format being a check box format, which limits the cell input to be 0 or 1, if the target data input by the user is 2, the target data is determined to be invalid data; in response to the rendering format being a progress bar, which limits the cell input to be 0 to 1, if the target data input by the user is 1.1, the target data is determined to be invalid data.

In some embodiments of the present disclosure, in a case that the target data is determined to be invalid data through data verification, prompt information may also be displayed, and the prompt information is used to prompt that the target data is invalid data. For example, as shown in FIG. 2a, the data format of the cell format set by the user is "numerical value", the data format of the data verification condition set for the cell is a date, the start date is Nov. 1, 2021, and the end date is Nov. 21, 2021; the target data input by the user is 40, and in a case that the target data is verified according to the data verification condition, the target data is determined to be invalid data, and a prompt message is displayed. As another example, as shown in FIG. 2b, the data verification condition set by the user is a check box and the data input condition corresponding to the check box is 0 or 1. In a case that the data input by the user is 3, the data will be determined to be invalid data, and the prompt message will be displayed.

In some embodiments of the present disclosure, after the verification result is determined, the target cell can also be rendered according to the verification result and the target data. That is, the content displayed in the target cell is determined according to the verification result and the target data. Specifically, in response to the first format being the data format and the verification result being invalid data, the target data is filled into the target cell and the target cell is marked. This mark is used to prompt the user that the data in the target cell mismatches with the condition for data verification. For example, as shown in FIG. 2a, the data 40 is stored in a cell, and a triangle is marked in the upper right corner of the cell to prompt, through the triangle, that the data is invalid data. Alternatively, in response to the first format being the data format and the verification result being valid data, the target data is filled into the target cell. That is, in a case that the data format and value of the target data match with the data format and the data range in the data verification condition, the target data is directly displayed in the cell.

In some embodiments of the present disclosure, in a case that the first format is a rendering format, in response to the verification result being valid data, the target cell is rendered according to the rendering format and the target data; in response to the verification result being invalid data, the target data is filled into the target cell and the target cell is marked. Here, the mark of the target cell is used to identify that the data in the target cell matches with the condition limited by the data verification.

In some embodiments of the present disclosure, in a case that the first format is a rendering format, in response to the verification result being valid data, the target cell is rendered according to the rendering format and the target data, which may comprise the following.

If the first format is the check box format in the rendering format, if the verification result is valid data, and if the target data is the first value, then the check box is displayed in the target cell and the check box is in a selected state. Here, the first value can be preset, and these embodiments is not limited herein. For example, the first value is 1, the user inputs 1 in the target table, and then a check box is displayed in the target table and the check box is in a selected state, as shown in the second check box in FIG. 2b.

If the first format is the check box format in the rendering format, if the verification result is valid data, and if the target data is the second value, then the check box is displayed in the target cell and the check box is in an unselected state. Here, the second value is different from the first value. For example, the second value is 0, the user inputs 0 in the target table, and then the check box is displayed in the target table and the check box is in an unselected state, as shown in the first check box in FIG. 2b.

If the first format is the progress bar format in the rendering format and the verification result is valid data, then the progress bar is rendered in the target cell according to the target data, and the length of the progress bar is related to the value of the target data. For example, as shown in FIG. 2c, the data range corresponding to the progress bar is 0 to 1, and the target data input by the user is 0.5, and then the length of the progress bar rendered in the target cell is half of the entire cell length and the data 0.5 is displayed.

It should be noted that in a case that the first format is the check box format in the rendering format and the verification result is invalid data, the check box is not displayed in the target cell. That is, in a case that the target data input by the user is invalid data, the check box is not visible. In a case that the first format is the progress bar format in the rendering format and the verification result is invalid data, the progress bar is not rendered in the target cell.

In some embodiments of the present disclosure, in step 102, in response to inputting being triggerred by the user, the target data input by the user in the target cell is obtained; where the target data input by the user can be content data (for example, a number, a text, or a picture, etc.), or it can be format data, such as a cell-like background style, a border style, a structural format, and/or the like.

In some embodiments of the present disclosure, in a case that the target data is format data, verifying the format of the target data and the value of the target data according to the data verification condition in step 103 comprises: determining whether the format of the cell is consistent with the format set in the verification condition, and obtaining the verification result according to the judgment result. For example, if the verification condition is set to red background color of the cell, then the verification will fail if the color of the cell is set to yellow, and the verification will pass if the color of the cell is set to red; or if the verification condition is set to one of merging cells, filtering cells, or freezing cells, then the verification will pass if the cell is set by the user to the above format, otherwise the verification will fail. These embodiments can directly verify the format of the cell, breaking through the limitation that the traditional cell verification can only verify the input cell content, expanding the scope of cell verification, and enriching the verification means in the spreadsheet editing process.

Based on the above method embodiments, embodiments of the present disclosure provide a device and an electronic device for table data verification, which will be described below with reference to the accompanying drawings.

Figure 3:
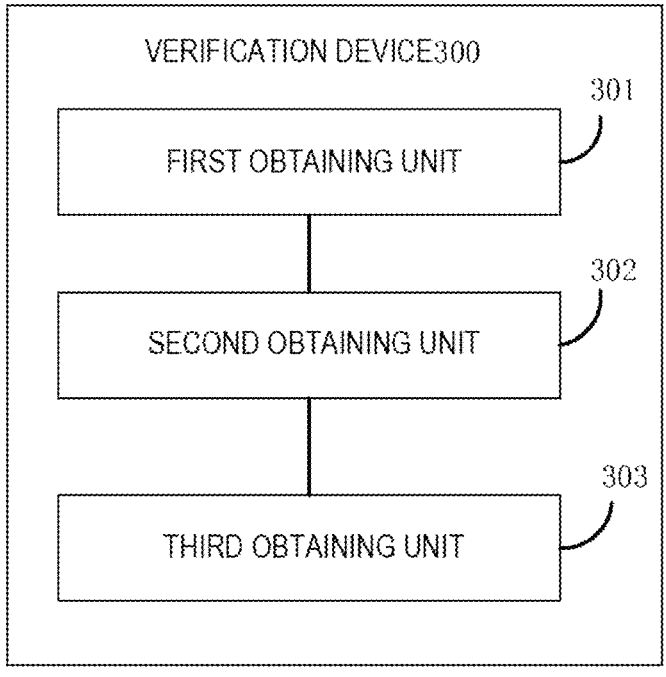
FIG. 3 is a structural schematic diagram of a device for table data verification according to an embodiment of the present disclosure.

Reference is made to FIG. 3, which shows a structural diagram of a device for table data verification according to an embodiment of the present disclosure. As shown in FIG. 3, the device may include: a first obtaining unit 301, a second obtaining unit 302 and a third obtaining unit 303.

The first obtaining unit 301 is configured to in response to setting being triggered by a user, obtain a data verification condition set for a target cell, the data verification condition including a first format and a data range.

The second obtaining unit 302 is configured to in response to inputting being triggerred by the user, obtain a target data input by the user in the target cell.

The third obtaining unit 303 is configured to verify a format of the target data and a value of the target data according to the data verification condition to obtain a verification result, the format of the target data being a second format corresponding to the target cell format.

In a specific implementation, the first format includes a data format and a rendering format, the data format is used to indicate a type of data input in the target cell, and the rendering format is used to indicate a style presented by the target cell.

In a specific implementation, the data format at least includes one or more of a numerical type, a date type, a currency type, and a time type; and the rendering format includes a check box format or a progress bar format.

In a specific implementation, the third obtaining unit 303 is specifically configured to in response to the format of the target data mismatching with the data format in the data verification condition, and/or the value of the target data mismatching with the data range in the data verification condition, determine that the target data is invalid data.

In a specific implementation, the third obtaining unit 303 specifically configured to in response to the first format being the rendering format and the data range of the target data mismatching with the data range in the data verification condition, determine that the target data is invalid data.

In a specific implementation, the device further includes: a displaying unit.

The displaying unit is configured to display a prompt message, and the prompt message is used to prompt that the target data is invalid data.

In a specific implementation, the device further includes: a processing unit.

The processing unit is configured to render the target cell according to the verification result and the target data.

In a specific implementation, the processing unit is specifically configured to in response to the first format being a data format and the verification result being invalid data, fill the target data into the target cell and mark the target cell;

alternetively, in response to the first format being a data format and the verification result being valid data, fill the target cell into the target data.

In a specific implementation, the processing unit is specifically configured to in response to the first format being a rendering format and the verification result being valid data, render the target cell according to the rendering format and the target data; alternatively, in response to the first format being the rendering format and the verification result being invalid data, fill the target data into the target cell and mark the target cell.

In a specific implementation, the processing unit is specifically configured to in response to the first format being a check box format, the verification result being valid data, and the target data being a first value, display a check box in the target cell, the check box being in a selected state; or, in response to the first format being the check box format, the verification result being valid data, and the target data being a second value, display a check box in the target cell, and the check box being in an unselected state.

In a specific implementation, the processing unit is specifically configured to in response to the first format being a progress bar format and the verification result being the valid data, render a progress bar in the target cell according to the target data, and the length of the progress bar is related to the value of the target data.

In a specific implementation, the first format has a higher priority than the second format.

It should be noted that the implementation of the individual units in this embodiment may refer to the above method embodiments, and these embodiments will not be repeated herein.

Figure 4:
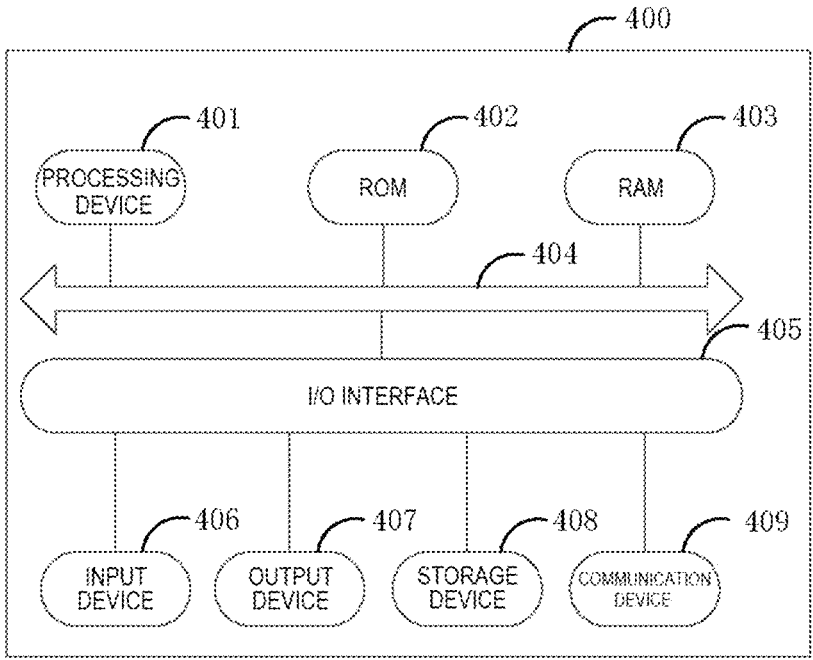
FIG. 4 is a structural schematic diagram of an electronic device according to an embodiment of the present disclosure.

Reference is madee to FIG. 4, which shows a schematic diagram of a structure of an electronic device 400 suitable for implementing embodiments of the present disclosure. Terminal devices in the embodiments of the present disclosure may include, but are not limited to, a mobile terminal such as a mobile phone, a notebook computer, a digital broadcast receiver, a Personal Digital Assistant (PDA), a portable android device (PAD), a Portable Media Player (PMP), a vehicle-mounted terminals (for example, a vehicle-mounted navigation terminal), and/or the like, and a fixed terminal such as a digital TV (television), a desktop computer, and/or the like. The electronic device shown in FIG. 4 is only an example and should not suggest any limitation to the functions and use scope of the embodiments of the present disclosure.

As shown in FIG. 4, the electronic device 400 may include a processing device (for example, a central processing unit, a graphic processor, etc.) 401, which may perform various appropriate actions and processes according to a program stored in a read-only memory (ROM) 402 or a program loaded from a storage device 408 into a random access memory (RAM) 403. In the RAM 403, various programs and data required for the operation of the electronic device 400 are also stored thereon. The processing device 401, the ROM 402 and the RAM 403 are connected to each other via a bus 404. An input/output (I/O) interface 405 is also connected to the bus 404.

Generally, the following devices may be connected to the I/O interface 405: an input device 406 including, for example, a touch screen, a touch pad, a keyboard, a mouse, a camera, a microphone, an accelerometer, a gyroscope, and/or the like; an output device 407 including, for example, a liquid crystal display (LCD), a loudspeaker, a vibrator and/or the like; a storage device 408 including, for example a magnetic tape, a hard disk, and/or the like; and a communication device 409. The communication device 409 may allow the electronic device 400 to communicate wirelessly or wiredly with other devices to exchange data. Although FIG. 4 shows an electronic device 400 with various devices, it should be understood that it is not required to implement or have all of the shown devices. More or fewer devices may alternatively be implemented or provided.

In particular, according to embodiments of the present disclosure, the processes described above with reference to the flowcharts may be implemented as a computer software program. For example, embodiments of the present disclosure include a computer program product, which includes a computer program carried on a non-transitory computer-readable medium, the computer program includes program codes for performing the method shown in the flowchart. In such embodiments, the computer program can be downloaded and installed from the network through the communication device 409, or installed from the storage device 408, or installed from the ROM 402. In a case that the computer program is executed by the processing device 401, the above-mentioned functions defined in the method of embodiments of the present disclosure are performed.

The electronic device according to the embodiments of the present disclosure and the table data verification method according to the above embodiments belong to the same inventive concept, and technical details not described in detail in these embodiments can be found in the above embodiments, and these embodiments has the same beneficial effect as the above embodiments.

The embodiments of the present disclosure provide a computer-readable medium on which a computer program is stored, where when the program is executed by a processor, implements the table data verification method described in any of the above embodiments.

It should be noted that the computer-readable medium mentioned above in the present disclosure may be a computer-readable signal medium or a computer-readable storage medium, or any combination of the above two. The computer-readable storage medium may be, for example, but is not limited to, an electrical, magnetic, optical, electromagnetic, infrared, or semiconductor system, apparatus or device, or any combination of the above. More specific examples of computer readable storage media may include, but are not limited to: an electrical connection having one or more wires, a portable computer disk, a hard disk, a random access memory (RAM), a read-only memory (ROM), a erasable memory programmable read-only memory (EPROM or flash memory), an optical fiber, a portable compact disk read-only memory (CD-ROM), an optical storage device, a magnetic storage device, or any suitable combination of the above. In the present disclosure, a computer-readable storage medium may be any tangible medium containing or storing a program that may be used by or in combination with an instruction execution system, apparatus, or device. In the present disclosure, however, the computer-readable signal medium may include a data signal propagated in baseband or as part of a carrier, carrying the computer-readable program codes therein. Such propagated data signals may take a variety of forms, including but not limited to an electromagnetic signal, an optical signal, or any suitable combination of the above. A computer-readable signal medium may also be any computer-readable medium other than a computer-readable storage medium that can send, propagate, or transmit a program for use by or in combination with an instruction execution system, apparatus, or device. Program codes embodied on a computer-readable medium may be transmitted using any suitable medium, including but not limited to: a wire, an optical fiber cable, a RF (radio frequency), and/or the like, or any suitable combination of the above.

In some implementations, the client and server can communicate using any currently known or future developed network protocol such as HTTP (HyperText Transfer Protocol), and may be interconnected with digital data communications (for example, communication networks) of any form or medium. Examples of communication networks include local area networks ("LANs"), wide area networks ("WANs"), inter-networks (for example, the Internet), and end-to-end networks (for example, ad hoc end-to-end networks), as well as any currently known or developed in the future networks.

The above-mentioned computer-readable medium may be included in the above-mentioned electronic device; which may also exist independently without being assembled into the electronic device.

The above-mentioned computer-readable medium carries one or more programs, in a case that the above-mentioned one or more programs are executed by the electronic device, causes the electronic device to perform the above-mentioned method of table data verification.

Computer program codes for performing the operations of the present disclosure may be written in one or more programming languages, including, but not limited to, object-oriented programming languages-such as Java, Smalltalk, C++, and also including conventional procedural programming languages—such as "C" or similar programming languages. The program codes may be executed entirely on the user computer, partially on the user computer, as a stand-alone software package, partially on the user computer and partially on a remote computer or entirely on the remote computer or the server. In the case involving a remote computers, the remote computer can be connected to the user computer through any kind of network, including a local area network (LAN) or a wide area network (WAN), or it can be connected to an external computer (for example, by using an Internet service provider to connect via the Internet).

The flowcharts and block diagrams in the accompanying drawings illustrate the possible architecture, functions and operations of the systems, methods and computer program products according to the various embodiments of the present disclosure. At this point, each block in the flowchart or block diagram may represent a module, program segment, or a portion of codes that contains one or more executable instructions for implementing a specified logical function. It should also be noted that, in some alternative implementations, the functions labeled in the block may also occur in a different order than those labeled in the accompanying drawings. For example, two consecutively blocks represented may be performed substantially in parallel, or they may sometimes be executed in the reverse order, depending on the function involved. It is also be noted that each block of the block diagram and/or flowchart, and combinations of blocks in the block diagram and/or flowchart, can be implemented with a specialized hardware-based system that performs the specified function or operations, or can be implemented with a combination of specialized hardware and computer instructions.

The units involved in the embodiments described in the present disclosure can be implemented in software or hardware. Here, the name of the unit/module does not constitute a limitation on the unit itself under certain circumstances. For example, the voice data collection module can also be described as a "data collection module".

The functions described above herein may be performed, at least in part, by one or more hardware logic components. For example, non-limitingly, exemplary types of hardware logic components that may be used include: Field Programmable Gate Arrays (FPGAs), Application-Specific Integrated Circuits (ASICs), Application-Specific Standard Products (ASSPs), Systems on Chips (SOCs), Complex Programmable Logical device (CPLD) and so on.

In the context of the present disclosure, a machine-readable medium may be a tangible medium that may contain or store a program for use by or in conjunction with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus or devices, or any suitable combination of the above. More specific examples of machine-readable storage medium would include electrical connections based on one or more wires, a portable computerdisk, a hard disk, a random access memory (RAM), a read-only memory (ROM), an erasable programmable read-only memory (EPROM or flash memory), an optical fiber, a portable computer disk read-only memory (CD-ROM), an optical storage device, a magnetic storage device, or any suitable combination of the above.

It should be noted that each embodiment in this specification is described in a progressive manner, and each embodiment focuses on the differences with other embodiments, and each embodiment can be referred to each other for the same and similar parts. For the system or device disclosed in the embodiments, since it corresponds to the method disclosed in the embodiments, the description is relatively simple, and it is sufficient to refer to the method portion of the illustration for the relevant sections.

It should be understood that in this application, "at least one (item)" means one or more, and "a plurality of" means two or more. "And/or" is used to describe an association relationship of the associated objects, indicating that there can be three kinds of relationships, for example, "A and/or B" can mean: only A exists, only B exists, or A and B exist simultaneously, where A and B can be singular or plural. The character "/" generally indicates that the related objects are in an "or" relationship. "At least one (item) of the following" or similar expressions means any combination of these items, including any combination of a single item (one) or a plurality of items(ones). For example, at least one item (one) of a, b or c can mean: a, b, c, "a and b", "a and c", "b and c", or "a and b and c", where a, b, c can be single or multiple.

It should also be noted that in this article, relational terms such as first and second are only used to distinguish one entity or operation from another entity or operation, and do not necessarily require or imply the existence of any such actual relationship or order between these entities or operations. Furthermore, the terms "include", "comprise", or any other variations thereof are intended to cover a non-exclusive inclusion such that a process, a method, an article, or a device including a set of elements includes not only those elements, but also other elements that are not expressly listed, or also includes elements that are inherent to such process, method, article or device. Without further limitation, an element defined by the phrase "includes a . . . " does not exclude the existence of another identical element in the process, method, article, or device that includes the element.

The steps of the method or algorithm described in conjunction with the embodiments disclosed herein may be implemented directly in a hardware, in a software module executed by a processor, or in a combination of both. The software module may be located in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The above description of the disclosed embodiments enables those skilled in the art to implement or use the present disclosure. Various modifications to these embodiments will be apparent to those skilled in the art, and the general principles defined herein may be implemented in other embodiments without departing from the spirit or scope of the application. Therefore, the present disclosure will not to be limited to the embodiments shown herein, but will be subject to the widest scope consistent with the principles and novel features disclosed herein.

We claim:

1. A method of table data verification, comprising:
in response to setting being triggered by a user, obtaining, by an electronic device, a data verification condition set for a target cell, the data verification condition including a first format and a data range;
in response to inputting being triggered by the user, obtaining, by the electronic device, a target data input by the user in the target cell;
verifying, by the electronic device, a format of the target data and a value of the target data according to the data verification condition to obtain a verification result, the format of the target data being a second format corresponding to the target cell; and
rendering, on a display of the electronic device, the target cell according to the verification result and the target data, comprising:
in response to the first format being a data format and the verification result being invalid data, filling the target data into the target cell with a mark for prompting the user that the target data filled in the target cell mismatches with the data verification condition in terms of format and/or data range; or
in response to the first format being the data format and the verification result being valid data, filling the target data into the target cell.

2. The method of claim 1, wherein the first format includes the data format and a rendering format, the data format is used to indicate a type of data input in the target cell, and the rendering format is used to indicate a style presented by the target cell.

3. The method of claim 2, wherein the data format at least includes one or more of a numerical type, a date type, a currency type and a time type; and the rendering format includes a check box format and a progress bar format.

4. The method of claim 2, wherein verifying the format of the target data and the value of the target data according to the data verification condition to obtain the verification result comprises:
in response to the format of the target data mismatching with the data format in the data verification condition, and/or the value of the target data mismatching with the data range in the data verification condition, determining that the target data is invalid data.

5. The method of claim 2, wherein verifying the format of the target data and the value of the target data according to the data verification condition to obtain the verification result comprises:

in response to the first format being the rendering format and the data range of the target data mismatching with the data range in the data verification condition, determining that the target data is invalid data.

6. The method of claim 4, further comprising:

displaying, on the display of the electronic device, a prompt message for prompting that the target data is invalid data.

7. The method of claim 1, wherein rendering the target cell according to the verification result and the target data comprises:

in response to the first format being a rendering format and the verification result being valid data, rendering the target cell according to the rendering format and the target data; or in response to the first format being the rendering format and the verification result being invalid data, filling the target data into the target cell with a mark for prompting the user that the target data filled in the target cell mismatches with the data verification condition in terms of format and/or data range.

8. The method of claim 7, wherein in response to the first format being the rendering format and the verification result being the valid data, rendering the target cell according to the rendering format and the target data comprises:

in response to the first format being a check box format, the verification result being the valid data and the target data being a first value, displaying a check box in the target cell, the check box being in a selected state; or in response to the first format being the check box format, the verification result being the valid data and the target data being a second value, displaying a check box in the target cell, the check box being in an unselected state.

9. The method of claim 7, wherein in response to the first format being the rendering format and the verification result being the valid data, rendering the target cell according to the rendering format and the target data comprises:

in response to the first format being a progress bar format and the verification result being the valid data, rendering a progress bar in the target cell according to the target data, the length of the progress bar being related to the value of the target data.

10. The method of claim 1, wherein the first format has a higher priority than the second format.

11. An electronic device, comprising:

a processor and a memory;

the memory configured to store instructions or computer programs;

the processor configured to execute the instructions or the computer programs stored in the memory to cause the electronic device to perform acts comprising:

in response to setting being triggered by a user, obtaining, by the electronic device, a data verification condition set for a target cell, the data verification condition including a first format and a data range;

in response to inputting being triggered by the user, obtaining a target data input by the user in the target cell;

verifying a format of the target data and a value of the target data according to the data verification condition to obtain a verification result, the format of the target data being a second format corresponding to the target cell; and rendering, on a display of the electronic device, the target cell according to the verification result and the target data, comprising:

in response to the first format being a data format and the verification result being invalid data, filling the target data into the target cell with a mark for prompting the user that the target data filled in the target cell mismatches with the data verification condition in terms of format and/or data range; or in response to the first format being the data format and the verification result being valid data, filling the target data into the target cell.

12. The electronic device of claim 11, wherein the first format includes the data format and a rendering format, the data format is used to indicate a type of data input in the target cell, and the rendering format is used to indicate a style presented by the target cell.

13. The electronic device of claim 12, wherein the data format at least includes one or more of a numerical type, a date type, a currency type and a time type; and the rendering format includes a check box format and a progress bar format.

14. The electronic device of claim 12, wherein verifying the format of the target data and the value of the target data according to the data verification condition to obtain the verification result comprises:

in response to the format of the target data mismatching with the data format in the data verification condition, and/or the value of the target data mismatching with the data range in the data verification condition, determining that the target data is invalid data.

15. The electronic device of claim 12, wherein verifying the format of the target data and the value of the target data according to the data verification condition to obtain the verification result comprises:

in response to the first format being the rendering format and the data range of the target data mismatching with the data range in the data verification condition, determining that the target data is invalid data.

16. The electronic device of claim 14, further comprising:

displaying, on the display of the electronic device, a prompt message for prompting that the target data is invalid data.

17. A non-transitory computer-readable storage medium storing instructions, the instruction, when running on an electronic device, causing the electronic device to perform acts comprising:

in response to setting being triggered by a user, obtaining, by the electronic device, a data verification condition set for a target cell, the data verification condition including a first format and a data range;

in response to inputting being triggered by the user, obtaining, by the electronic device, a target data input by the user in the target cell;

verifying a format of the target data and a value of the target data according to the data verification condition to obtain a verification result, the format of the target data being a second format corresponding to the target cell; and rendering, on a display of the electronic device, the target cell according to the verification result and the target data, comprising:

in response to the first format being a data format and the verification result being invalid data, filling the target data into the target cell with a mark for prompting the user that the target data filled in the target cell mismatches with the data verification condition in terms of format and/or data range; or in response to the first format being the data format and the verification result being valid data, filling the target data into the target cell.

\* \* \* \* \*